(12) United States Patent
Skinner et al.

(10) Patent No.: US 9,986,682 B2
(45) Date of Patent: Jun. 5, 2018

(54) TRIMMER HEAD WITH PIVOT POSTS HOLDING A SINGLE STRIP OF LINE

(71) Applicant: Shakespeare Company, LLC, Columbia, SC (US)

(72) Inventors: David B. Skinner, Columbia, SC (US); Wen Liu, Guangshui (CN)

(73) Assignee: Shakespeare Company, LLC, Boca Raton, FL (US)

( * ) Notice: Subject to any disclaimer, the term of this patent is extended or adjusted under 35 U.S.C. 154(b) by 277 days.

(21) Appl. No.: 14/731,895

(22) Filed: Jun. 5, 2015

(65) Prior Publication Data
US 2015/0351319 A1   Dec. 10, 2015

Related U.S. Application Data

(60) Provisional application No. 62/008,366, filed on Jun. 5, 2014.

(51) Int. Cl.
*A01D 34/416*   (2006.01)

(52) U.S. Cl.
CPC ............... *A01D 34/4166* (2013.01)

(58) Field of Classification Search
CPC ................ A01D 34/4166; A01D 34/416
USPC .... 30/276, 347, 337, 330, 331, 338, DIG. 5, 30/286.1, 272.1, 122; 56/240, 239, 12.7, 56/295, 17.5, 255; D8/1, 7, 8, 9, 383, D8/499
See application file for complete search history.

(56) References Cited

U.S. PATENT DOCUMENTS

| | | | |
|---|---|---|---|
| 4,756,146 A * | 7/1988 | Rouse ............... | A01D 34/4166 30/276 |
| 5,758,424 A | 6/1998 | Iacona | |
| 5,836,227 A | 11/1998 | Dees, Jr. et al. | |
| 5,887,348 A | 3/1999 | Iacona | |
| 5,896,666 A | 4/1999 | Iacona | |
| 6,035,618 A | 3/2000 | Fogle | |
| 6,347,455 B2 | 2/2002 | Brant et al. | |
| 6,401,344 B1 | 6/2002 | Moore | |
| 6,457,242 B1 * | 10/2002 | Fogle ............... | A01D 34/4166 30/276 |
| 6,519,857 B1 | 2/2003 | Proulx et al. | |
| 6,581,292 B2 | 6/2003 | Alliss | |
| 6,928,741 B2 | 8/2005 | Proulx et al. | |
| 6,944,956 B1 | 9/2005 | Fogle | |

(Continued)

*Primary Examiner* — Ghassem Alie
(74) *Attorney, Agent, or Firm* — Eversheds Sutherland (US) LLP

(57) ABSTRACT

A fixed-line trimmer head for a rotary trimmer device includes the upper portion having a periphery, wherein the upper portion has a plurality of openings spaced from the periphery; and a plurality of mechanisms. Each mechanism can hold a strip of line and includes a post portion disposed through one of the openings in the upper portion, and a flange disposed at one end of the post portion and sandwiched between the upper portion and lower portion of the trimmer head to prevent vertical movement of the mechanism. The post portion includes two line channels, each line channel defining a passageway to receive the same strip of line, wherein at least one of the line channels is curved such that any portion of the strip of line being received through the passageway of that line channel is bent at that portion of the strip of line away from the second line channel while passing through that at least one line channel that is curved.

7 Claims, 18 Drawing Sheets

(56) References Cited

U.S. PATENT DOCUMENTS

| | | |
|---|---|---|
| 6,983,543 B2 | 1/2006 | Fogle |
| 7,000,324 B2 | 2/2006 | Fogle |
| 7,111,403 B2 | 9/2006 | Moore |
| D532,263 S | 11/2006 | Iacona |
| 7,257,898 B2 | 8/2007 | Iacona |
| 7,536,792 B2 | 5/2009 | Moore |
| D597,804 S | 8/2009 | Alliss |
| D598,254 S | 8/2009 | Alliss |
| 7,603,782 B2 | 10/2009 | Jerez |
| 7,665,215 B2 | 2/2010 | Fogle |
| 7,743,511 B2 | 6/2010 | Jerez |
| 8,307,558 B2 | 11/2012 | Alliss |
| 2002/0073556 A1* | 6/2002 | Fogle .................... A01D 34/416 30/276 |
| 2004/0103543 A1 | 6/2004 | Fogle |
| 2005/0126017 A1 | 6/2005 | Fogle |
| 2006/0026846 A1 | 2/2006 | Alliss |
| 2006/0053636 A1 | 3/2006 | Fogle |
| 2008/0034724 A1* | 2/2008 | Jerez .................... A01D 34/416 56/240 |
| 2008/0271424 A1 | 11/2008 | Alliss |
| 2009/0031567 A1 | 2/2009 | Fogle |
| 2009/0038163 A1 | 2/2009 | Jerez |
| 2015/0342117 A1* | 12/2015 | Alliss ................. A01D 34/4166 30/276 |
| 2015/0366131 A1* | 12/2015 | Skinner .............. A01D 34/4166 30/276 |

\* cited by examiner

US 9,986,682 B2

TRIMMER HEAD WITH PIVOT POSTS HOLDING A SINGLE STRIP OF LINE

CROSS-REFERENCE TO RELATED APPLICATION

This application claims the benefit of U.S. Provisional Patent Application No. 62/008,366, filed Jun. 5, 2014, the entirety of which is incorporated herein by reference.

FIELD OF INVENTION

The present invention relates generally to trimmer heads for rotary trimmers using monofilament line as a means for cutting vegetation. More particularly, the invention relates to trimmer heads with an improved means to hold single strips of trimmer line, the means being capable of pivoting to minimize line breakage upon impact with solid objects and dense vegetation.

BACKGROUND

Vegetation trimming devices are well known and are commonly used to maintain one's lawn and garden. There are a number of different classifications of rotary trimmer heads, defined generally by the manner in which a monofilament trimmer line is fed, spooled or replaced in the trimmer head and/or how the trimmer line is discharged, indexed or lengthened during use of the trimmer head. Such classifications include (a) "self-indexing" trimmer heads, wherein trimmer line is automatically released from a spool inside the trimmer head upon a determination of increased rotational speed of the trimmer head, (b) "bump-fed" or "bump-activated" trimmer heads, wherein trimmer line is mechanically released from a spool inside the trimmer head by the user "bumping" the bump knob or similar member on the ground so as to permit a length of line to be released, and (c) "fixed-line" trimmer heads, wherein a length of line is introduced and loaded or otherwise attached manually through spaced openings usually, but not always, at the periphery of the trimmer head into a line-holding mechanism that holds the trimmer line to the trimmer head during use, eliminating the need for a spool. The present invention is directed to a special type of these "fixed-line" trimmer heads.

The majority of aftermarket trimmer heads sold are (c) "fixed-line" trimmer heads because they are easily designed to be universally adaptable to essentially any brand of rotary trimmer regardless of the operation of the trimmer head or the direction of rotation. Replacement strips of trimmer line used for this type of trimmer head are typically about 8 to 15 inch in length and can be easily added to the head through either openings at the periphery or within the line-holding mechanisms employed. Generally, fixed-line trimmer heads use a base portion having a series of radially spaced line holders, each capable of holding one strip of trimmer line. After the line strip wears, the consumer manually removes the used strip. Once the old worn length of line is removed, a new length of trimmer line can be loaded into the line holding mechanism. There is no indexing or lengthening of the line during use. The ease-of-use has been a reason for the market acceptance of this type of trimmer head. However, the need for improvement still exists for this type of trimmer head.

There are a variety of methods and mechanisms developed and discussed in the prior art for holding a fixed length of trimmer line to a trimmer head. Among the more popular methods for holding strips of line include (i) means for holding one end of a single strip of line such that one end is held by and within the trimmer head, while the other end impacts and cuts vegetation, (ii) means disposed within the trimmer head housing for holding the strip of line in the middle such that both distal ends extend from the trimmer head for impacting and cutting vegetation, and (iii) means for holding a folded strip of line outside of, and typically above, the trimmer head such that both ends of the strip of line impacts or cuts vegetation. Since the present invention is focused on improving fixed-line trimmer heads that employ line-holding mechanisms similar to those used to hold folded strips of line (i.e., method (iii) above), but with certain modifications, the prior art and problems associated with these line-holding mechanisms for folded strips of line are further discussed.

U.S. Pat. Nos. 7,603,782 and 7,743,511, the disclosures of which are incorporated herein by reference, disclose trimmer heads with various line holding mechanisms for holding folded strips of line. Unlike the other types of "fixed line" trimmer heads, the strips of line are attached to the line-holding mechanism outside of the trimmer head housing. That is, the line is attached to the line-holding mechanism above or below the trimmer head housing. Furthermore, the line-holding mechanism is capable of pivoting on a vertical axis for the purpose of reducing stress on the line, not for any purpose related to the clamping, or otherwise holding, of the line.

While there are several mechanisms disclosed for holding folded strips of line, the most commercialized of these line holding mechanisms is disclosed in the '511 patent, wherein the line-holding mechanisms have the basic shape of a round post with a flange at the lower end. The top end is beveled (slanted) on two opposite sides with two straight-through passageways for insertion of the trimmer line as best seen in FIG. 19 of the '511 patent. The flange is sandwiched between a lower cover and the upper portion of the head and is held such that it can rotate about a vertical axis but cannot be move vertically. The pivot posts on commercial trimmer heads are injection molded as a single piece of plastic and have two straight, parallel through holes or line channels with a portion of plastic separating the two through holes or line channels.

To load the trimmer line into the trimmer head, two opposed ends of a folded strip of line are threaded through the two straight parallel holes till the central folded portion of line is pulled tightly against the portion of plastic separating the two holes. Typically, this is done by loading one end of the folded strip of line through an entrance to one of the parallel, straight through line channels and simultaneously or in series, loading the other end of the folded strip of line through an entrance to the other of the parallel, straight through line channels, which entrance is adjacent the first line channel. The folded strip is then pulled tight until the folded central portion of the strip of line disposed against the portion of plastic separating the two line channels. Commercial trimmer heads utilizing this type pivoting line holding mechanism can have two, three or four pivoting posts and are commercially available from various commercial outlets and manufacturers under the tradenames PivoTrim® X2, PivoTrim®, the PivoTrim® Classic and PivoTrim® Pro, wherein PivoTrim is a registered trademark of Better Heads, LLC of Pearland, Tex., and Ugly Head®, wherein Ugly Head is a registered trademark of Shakespeare Company, LLC, of Columbia, S.C., respectively.

During use, the trimmer head is rotated by a trimming device such as a weed trimmer machine or brush cutter. The ends of each folded piece of trimmer line will extend out radially beyond the periphery of the trimmer head due to the centrifugal force created by the rotation of the trimmer head. The tips of the trimmer line are able to cut vegetation due to their velocity, due to rotation of the trimmer head. However, if the trimmer line impacts an immovable object or very dense vegetation, the line and post can pivot away from the point of impact, which reduces the stress on the trimmer line.

Unfortunately, line drag has been found to be problem with this type of "fixed line" trimmer head. Because each line in the prior art for this type of "fixed line" trimmer head is folded in half to form an extended "U", each line is, in actuality, two lines cutting essentially the same vegetation at or near the same place relative to the trimmer head. If there four radially spaced line-holding mechanisms on a trimmer head, it will be appreciated that there are no fewer than eight extended lines, two for each line-holding mechanism, given that folded strips of line are required wherein the extended lengths from the fold to the end of the line are essentially equal in length. It has been found that, once one of the lines cuts the vegetation, the second line is not needed and only serves to slow the velocity of the tips of the lines due to wind drag. Further, it is also possible that the second line cuts vegetation that is already cut by the first line, again causing a reduction in the velocity of the entire line. Cutting vegetation that is already cut does not serve any identifiable purpose.

Thus, the need exists for a "fixed-line" trimmer head having a pivoting line-holding mechanism of the type similar to that used for folded strips of line, but which is capable of holding line that will lessen the drag upon the use of the line.

Because the present invention involves "fixed-line" trimmer heads for holding single strips of line in combination with pivoting mechanisms, the prior art with respect to this concept is also addressed. Specifically, both Iacona U.S. Pat. No. 7,257,898 and Aliss U.S. Pat. No. 8,307,558 teach methods for holding single strips of trimmer line in combination with pivoting posts. However, both of these mechanisms involve adding components, such as clamps and springs, to the internal portion of the pivoting mechanism. As a result, the housing of the mechanism must be enlarged to make room for the extra components. This makes the overall mechanism larger in size and adds weight. The increased weight from the larger post mechanisms and the added components is affected by the centrifugal force generated by the rotation velocity of the trimmer head. This increased outward centrifugal force increases the resistance to pivoting of the mechanism due to friction between the mechanism and the opening in the trimmer head. Thus, it is more difficult for the line-holding mechanism to pivot.

Likewise, the energy to pivot the line-holding mechanism is reduced due to the reduction from two legs to one leg of trimmer line extending from the trimmer head. The line, being operatively connected to the pivot mechanism, when impacted by an immovable object provides the energy to rotate the line-holding mechanism in one direction so that the line moves away from the object. The centrifugal force acting on the line then provides the energy to rotate the mechanism in the second direction. The centrifugal force makes the line pivot until it reaches an outward radial position. The amount of centrifugal force is dependent on the rotational speed and the mass of line. By reducing the number of end lengths extending from the mechanism from two per mechanism to one per mechanism, the centrifugal force is reduced in half. The energy associated with this reduced centrifugal force must overcome the increased frictional resistance associated with the heavier pivot post.

Thus, the need exists for a "fixed-line" trimmer head having a pivoting line-holding mechanism of the type similar to that used for folded strips of line, but which is capable of holding line that will lessen the drag upon the use of the line and which does not increase the weight of the line-holding mechanism.

SUMMARY OF THE INVENTION

At least one or more of the foregoing aspects of the present invention, together with the advantages thereof over the known art relating to fixed-line trimmer heads, which shall become apparent from the specification and drawings that follows, may be accomplished by the invention as hereinafter described and claimed.

Generally, and as noted above, the present invention relates to a fixed-line type of trimmer head of the type that employs line-holding mechanism similar to those used for holding folded strips of line. However, in those fixed line trimmer heads, both ends of the folded strip of line is used to cut vegetation. In this invention, the line-holding mechanisms have been designed to hold a single strip of line, not a centrally-folded strip of line, above the housing of the trimmer heard in a manner where one end of the strip of line is lengthy enough to extend beyond the periphery of the trimmer head so as to impact and cut vegetation, while the other end of the strip of line is shorter and displaced from being parallel to the other end of the strip of line like in a folded strip of line. Thus, the other end of the strip of line does not extend beyond the periphery of the trimmer head housing and does not cut vegetation.

One aspect of this invention may be achieved by a fixed-line trimmer head for a rotary trimmer device to be utilized with two or more strips of line. The trimmer head includes a housing operatively attachable to the rotary trimmer device, the housing being rotatable when in use around a central axis of rotation. The housing includes an upper portion and a lower portion extending radially from the central axis, the upper portion having a periphery. The upper portion has a plurality of openings spaced from the periphery. The fixed-line trimmer head further includes a plurality of mechanisms, each mechanism being pivotable around a vertical axis and adapted to hold a strip of line. The mechanism includes a post portion disposed through one of the openings in the upper portion of the housing, and a flange disposed at one end of the post portion and sandwiched between the upper portion and lower portion to prevent vertical movement of the mechanism. The post portion includes two unobstructed line channels, each line channel defining a passageway adapted to receive the same strip of line. At least one of the line channels is curved such that any portion of the strip of line capable of being received through the passageway of that line channel is bent at that portion of the strip of line away from the second line channel while passing through that at least one line channel that is curved.

In one or more embodiments of the invention, both line channels of each post portion are curved such that any portions of a strip of line capable of being received through the passageways of either of those line channels are bent at those portions of the strip of line while passing through the line channels. In one or more of these embodiments, both line channels have an entrance and an exit, wherein the entrance of one line channel faces opposite the exit of the other line channel on the post portion of the mechanism. In one or more of these embodiments, both line channels are transverse to the vertical axis of the mechanism. In one or more other of these embodiments, the line channels are parallel to the vertical axis of the mechanism. In one or more of these embodiments, the exit of the one line channel is adjacent to the entrance of the other line channel, with the exit of the one line channel being proximate to its entrance and the entrance of the other line channel being proximate to its exit. In one or more other embodiments the exit of the one line channel is adjacent to the entrance of the other line channel at the end of the post portion opposite the flange, where the exit of the one line channel is proximate to its entrance and the entrance of the other line channel is proximate to its exit.

In one or more other embodiments of the invention, one of the two line channels of a mechanism is straight such that any portion of the strip of line capable of being received through the passageway of that line channel is not bent at that portion of the strip of line while passing through that line channel. Of course, the other of the line channels is curved as described above. In one or more of these embodiments, both line channels are transverse to the vertical axis of the mechanism. In one or more other of these embodiments, both line channels are parallel to the vertical axis of the mechanism. Again, one or more embodiments of the invention may have an exit of one line channel that is adjacent to and parallel with the entrance of the other line channel, while the entrance of the one line channel is spaced from and not parallel to the exit of the other line channel. In one or more embodiments, the exit of the other of the line channels is disposed through the end of the post portion opposite the flange.

In one or more embodiments, the present invention provides an embodiment of the fixed-line trimmer head as described above, in combination with a plurality of strips of line adapted to cut vegetation. Each strip of line is held to the trimmer head by one of the plurality of mechanisms and is received through all of the passageways defined by the two line channels on the mechanism. One end of the strip of line is distal from the mechanism and extends beyond the periphery of the upper portion of the housing of the trimmer head to cut vegetation, while the other end of the strip of line is proximate to the mechanism and does not extend beyond the periphery of the upper portion of the housing of the trimmer head. In the manner, it will be appreciated that the strips of line will cause less drag to the trimmer head than previously provided to trimmer heads that used folded trimmer line wherein both ends of the folded strip of line was used to cut vegetation.

Another aspect of this invention may be achieved by a mechanism to be utilized for holding a strip of line. The mechanism includes a post portion; and a flange disposed at one end of the post portion and extending beyond the periphery of the post portion. The post portion includes two unobstructed line channels. Each line channel defines a passageway adapted to receive the strip of line, and at least one of the line channels is curved such that any portion of the strip of line capable of being received through the passageway of that line channel is bent at that portion of the strip of line away from the second line channel while passing through the at least one line channel that is curved.

In one or more embodiments, both line channels are curved such that any portion of the line capable of being received by the line channels must be bent at those portions while passing through the line channels. In other embodiments, one line channel is straight such that any portion of the strip of line capable of being received by that line channel is not bent at that portion of the strip of line while passing through that line channel, while the other line channel is curved.

In embodiments where both line channels are curved, further embodiments include both line channels having an entrance and an exit, wherein the entrance of one line channel faces opposite the exit of the other line channel on the post portion of the mechanism. In some of the same embodiments, the exit of one line channel is adjacent to the entrance of the other line channel, where the exit of the one line channel is proximate to its entrance and the entrance of the other line channel is proximate to its exit. In embodiments where one line channel is straight and the other line channel is curved, both line channels have an entrance and an exit, with the exit of one of the line channel being adjacent to and parallel with the entrance of the other line channel, while the entrance of the one line channel is spaced from and not parallel to the exit of the other line channel.

Advantageously, it will be appreciated that, by providing a pivoting mechanism suitable for use in holding a strip of line such that one end of the strip of line may extend beyond, by as much as 7 to 15 inches, the periphery of the trimmer head while the other end of the strip of line does not extend beyond the periphery of the trimmer head, only half the amount of line is used to cut vegetation when the trimmer head is rotated as compared to trimmer heads that use folded strips of line, wherein both ends of the folded strips of line extend beyond the periphery of the trimmer head. Because less line use used, there is significantly less drag on the trimmer head by the line as compared to prior art trimmer heads using mechanisms for holding folded strips of line. Additionally, because the means to fix the line to the mechanism does not require internally embedded biased clamps, the weight of the mechanism is minimized and, hence, pivots more freely. Lastly, the proposed embodiments of this invention are unique in that one distal end of the line is available for trimming vegetation, whereas the second distal end exits the mechanism either opposite or orthogonal (i.e., approximately 90 or 180 degrees) to the other portion of the line exiting the line-holding mechanism. This angular difference keeps the consumer from being confused as to how to load the line.

For a fuller understanding of the nature and advantages of the present invention, reference should be made to the ensuing detailed description and accompanying drawings.

DETAILED DESCRIPTION OF THE INVENTION

Figure 1:
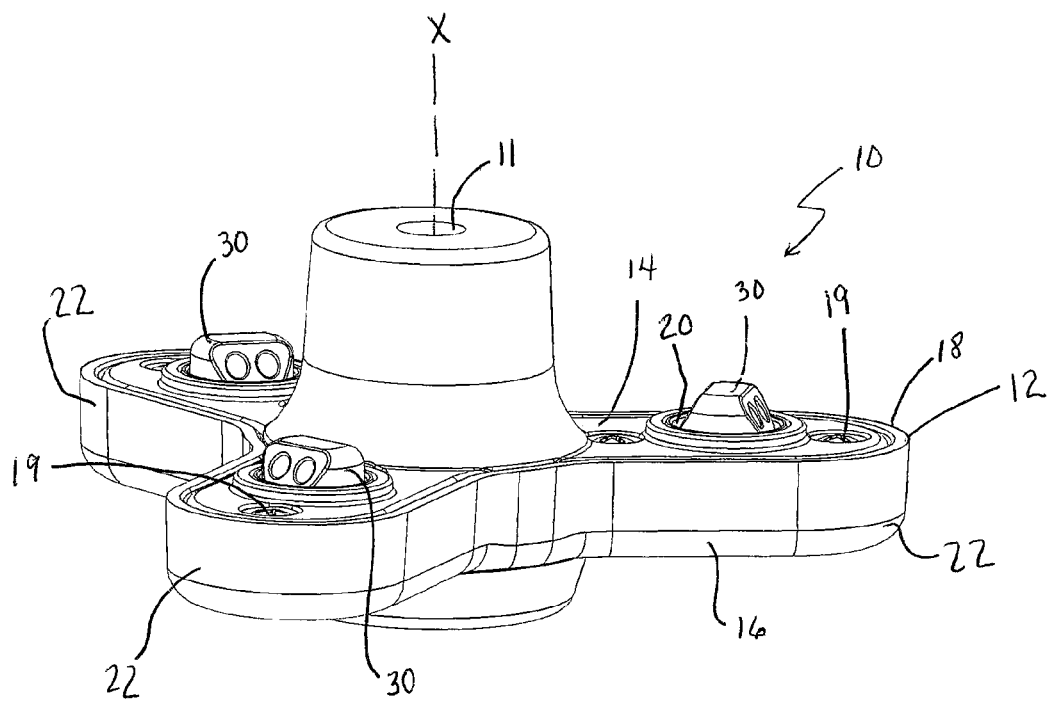
FIG. 1 is a perspective view of an embodiment of a prior art trimmer head commercially available and based upon U.S. Pat. No. 7,743,511 ("the Jerez patent")

As noted above, the trimmer head of the present invention is a "fixed-line" trimmer head of the type having a line-holding mechanism that is typically to be utilized for holding a folded strip of trimmer line in a manner such that both ends of the folded strip of trimmer line impacts and cuts vegetation. However, it has been found that using both ends of a folded strip of trimmer line to impact and cut vegetation is redundant is some instances (i.e., the vegetation is already cut by the first end of the folded trimmer line by the time the second end of the folded trimmer line can cut the vegetation), and causes drag on the trimmer head, due to the number of extended length ends of trimmer line (i.e., two for each folded strip of trimmer line) used in cutting the vegetation. In order to reduce the drag of the trimmer line on the trimmer head, the present invention seeks to reduce the number of extended length ends of trimmer line used. To do so however, the folded strips of trimmer line cannot extend from its line-holding mechanism with equal extended length ends, as is currently the case. Instead, the present invention provides for a line-holding mechanism adapted to hold a single strip of line wherein one end of the strip of line is of extended length so as to extend beyond the periphery of the trimmer head to impact and cut vegetation, while the other end of the strip of line is not of extended length and is sufficiently short so as not to extend beyond the periphery of the trimmer head to impact and cut vegetation.

While one might envision the prior art line-holding mechanisms being able to provide one extended and one short end for the folded strips of line, there is no such folded strips of line currently available on the market, and further use of a single strip of line that does not provide equal extended lengths of line extending from the line-holding mechanisms of the prior art could easily pull the line out of the current versions of the line-holding mechanisms due to the fact that the mechanisms have parallel, straight through line channels in each line-holding mechanism. These line channels were made for use with folded strips of line of approximately equal length ends. If the end lengths of the folded strips of line are not of equal lengths, then it is common for the shorter length end of the strip of line to be pulled back through its entrance and for the strip of line to be disengaged from the line-holding mechanism altogether. As such, the trimmer head of the present invention is believed to be a significant improvement over the trimmer head disclosed and taught by Jerez, in U.S. Pat. Nos. 7,743,511 and 7,603,782 (hereinafter "Jerez"), the disclosure of which is incorporated herein by reference.

In order to provide a full understanding of the present invention, it is believed necessary to provide a description of a prior art embodiment of a "fixed-type" trimmer line of the type typically employed for holding and using folded strips of line to impact and cut vegetation. Therefore, a trimmer head representing a current commercial embodiment of the prior art as taught by Jerez is referred to generally by the numeral 10 in FIG. 1, and is operably attachable to a rotary trimmer device (not shown) utilizing conventional means. For example, in the embodiment shown, a central threaded stem (not shown) on a conventional trimmer device (not shown) is passed through the central opening 11 in axial alignment with the axis of rotation (X) for the trimmer head and connected by a fastener (not shown), such as a hex bolt and nut. It will be appreciated that the trimmer head may be connected or otherwise attached to the rotary trimmer device by any manner known in the art.

As shown in FIG. 1, the trimmer head 10 includes a housing 12 defined by a upper portion or cover 14 and a bottom portion or main housing 16, both of which extend radially outward from a center axis of rotation identified by the broken line X. The upper and lower portions 14 and 16 form a relatively flat housing 12 having a periphery 18 and are held together, in this embodiment, by a plurality of screws 19. The upper portion further includes a plurality of openings 20 defined within the upper portion and spaced from the periphery 18 of the housing 12.

In this embodiment of the trimmer head 10, there are three sections or legs, extending approximately 120° apart, wherein each leg 22 includes one opening 20 for receiving one line-holding mechanism 30. It will be appreciated that the trimmer head 10 can be of any configuration known in the art and can typically have from 2 to 6 openings, and more preferably 3, 4 or 5 openings 20 for receiving the line-holding mechanisms 30 therethrough. Essentially, the line-holding mechanisms 30 are radially spaced apart so as to provide balance to the trimmer head during rotation.

Figure 2:
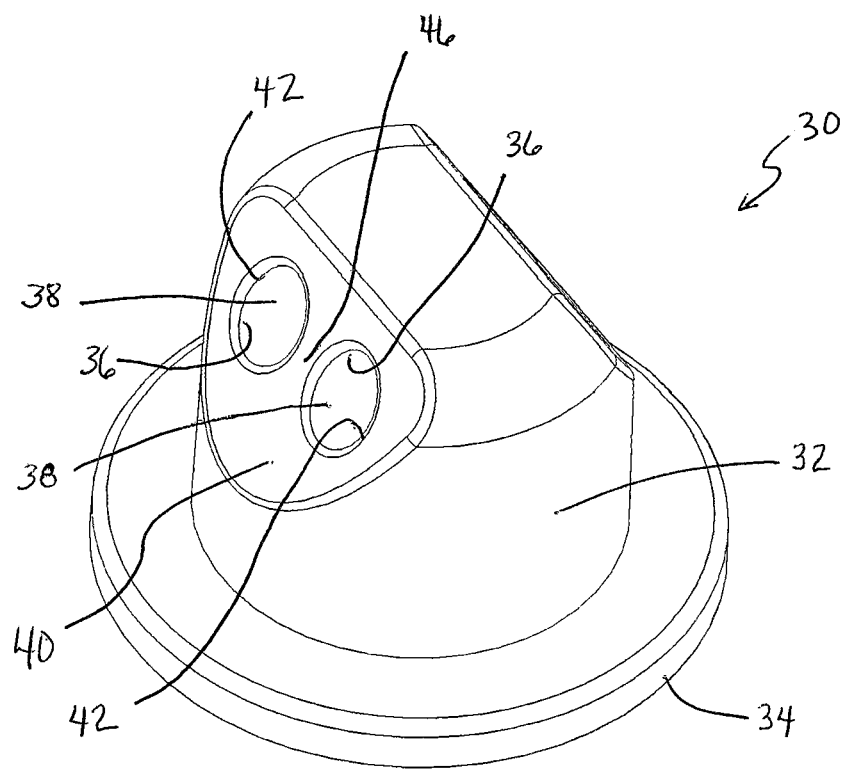
FIG. 2 is a perspective view of an embodiment of a prior art line-holding mechanism as used in the commercially available trimmer head of FIG. 1 and based upon the Jerez patent.
Figure 3:
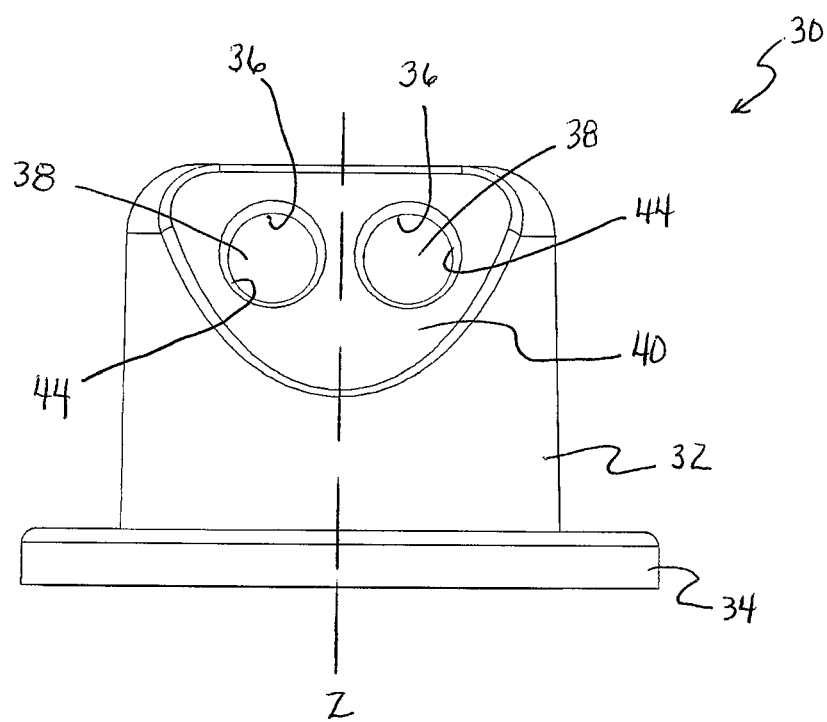
FIG. 3 is a rear elevational view of the prior art line-holding mechanism of FIG. 3 taken from a different perspective to show the other side of the mechanism.

As more particularly detailed in FIGS. 2 and 3, the line-holding mechanism 30 of the prior art generally consists of a plastic (e.g., glass filled nylon) molded post portion 32 with a flange 34 on the lower end and two parallel line channels 36 proximate the upper end of the post portion 32, wherein a portion of the plastic separates the two line channels 36. It will be appreciated that the flange 34 is sandwiched between the upper portion 14 and lower portion 16 to prevent the vertical movement of the mechanism 30. However, the mechanism 30 is not prevented from rotating freely about a vertical axis defined by the broken line Z. More particularly, it will be appreciated that a metal ring (not shown) is press fit into each of the openings 20, which metal ring acts as a bearing sleeve. Because of the metal ring/bearing sleeve, the mechanism 30 is constrained from all movement other than pivoting rotational movement around vertical axis Z when disposed with the trimmer head.

The two parallel line channels 36, 36a are molded into the plastic of the post portion to define two parallel, straight-through passageways 38, 38a extending from one side of the post portion to the other side. In the embodiment shown, the post portion 32 includes two beveled surfaces 40 on opposite sides of the post portion 32 on which are disposed the entrances 42 and exits 44 of the line channels 36 such that the beveled surfaces 40 provide for longer lengths of the line channels 36 near the bottom of the line channels and shorter lengths for the line channels 36 near the top of the line channels. In other words, both beveled surfaces slant upwards toward the center of the top end of the post portion 32.

To load the prior art line-holding mechanism 30, one of the two opposing ends of a folded strip of line (not shown) is inserted into or threaded through one of the respective straight passageways 38 defined by one of the respective line channels 36 at its entrance 42 and out its exit 44, while the other opposing end of the folded strip of line is, simultaneously or in series, inserted into or threaded through the other of the respective straight passageways 38 at its entrance 42 and out its exit 44, until the central folded portion of the strip of line is pulled tightly against the portion 46 of the plastic separating the two line channels 36. Once, fully inserted, the mechanism 30 holds the folded strip of trimmer line in place by centrifugal force during rotation.

The present invention provides for essentially the same trimmer head and housing with openings for receiving line-holding mechanisms as the prior art discussed above. However, the present invention differs significantly with respect to the design of the line holding mechanisms. Accordingly, the drawings and discussion henceforth will be substantially directed to different embodiments of the new line-holding mechanisms according to the concepts of the present invention. Where any recitations to the trimmer head or component parts other than those disposed as a part of the line-holding mechanism are discussed, the same numerals as used above will be set forth.

Figure 4:
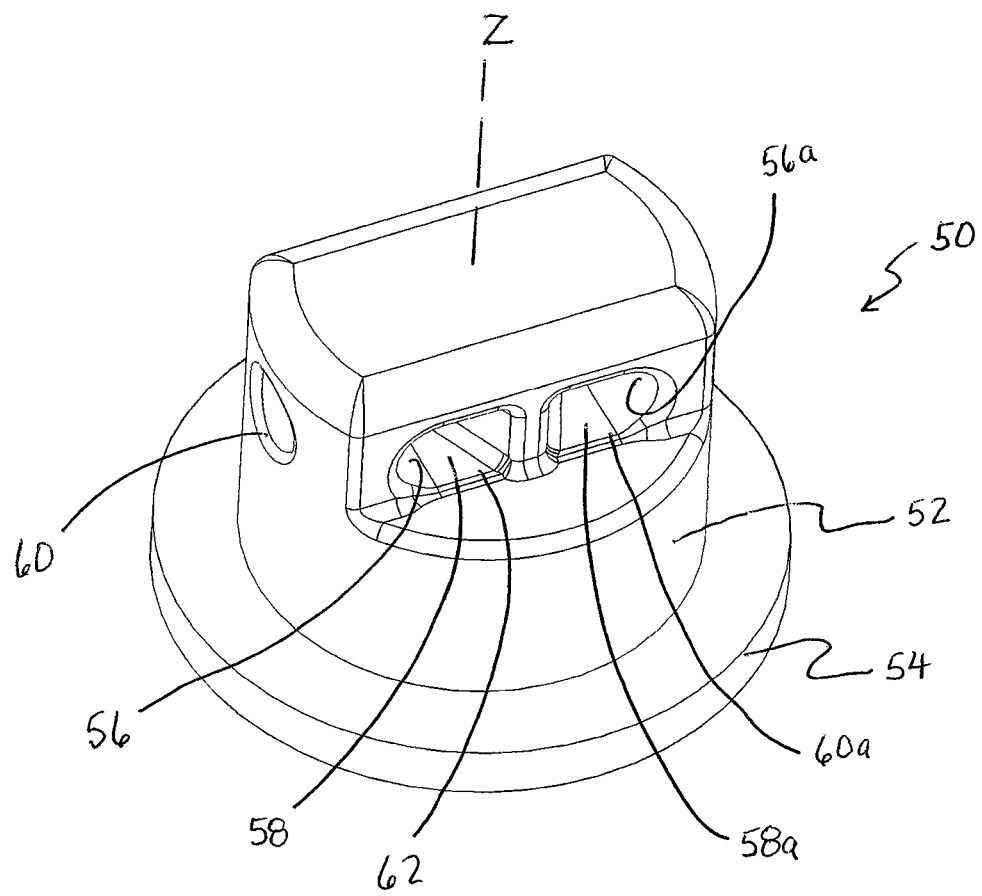
FIG. 4 is a perspective view of a first embodiment of a line-holding mechanism according to the concepts of the present invention.
Figure 5:
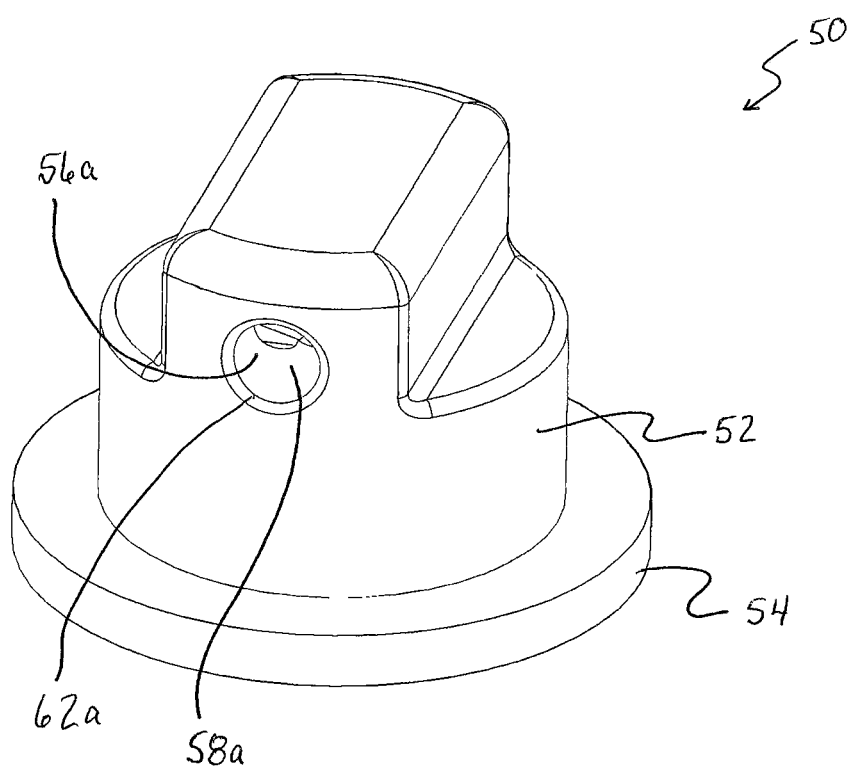
FIG. 5 is another perspective view of the line-holding mechanism of FIG. 4.
Figure 6:
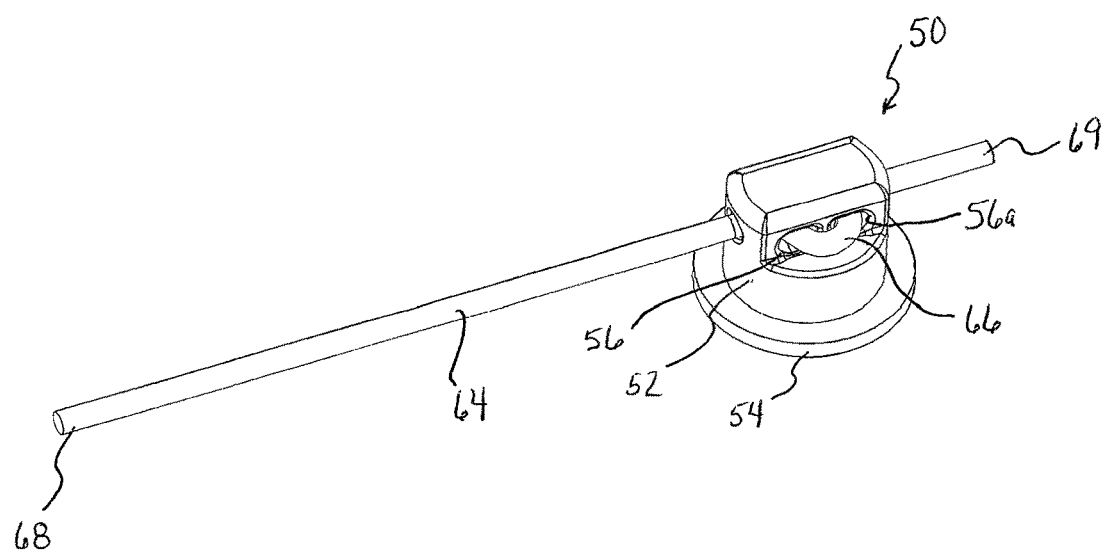
FIG. 6 is a perspective view of the line-holding mechanism of FIG. 4, having a strip of line loaded therein.

A first embodiment of a line-holding mechanism according to the concepts of the present invention is shown generally by the numeral 50 in FIGS. 4-6. This line-holding mechanism 50 includes a post portion 52 and a flange 54 which operate essentially as described above for the line-holding mechanisms 30 of the prior art. The flange 54 is disposed at one end of the post portion 52 and extends beyond the periphery of the post portion 52.

The post portion 52 includes two curved, unobstructed line channels 56, 56a, each of which defines a passageway 58, 58a adapted to receive a strip of line. By the term "unobstructed" as used throughout this paper, it is meant that the line channels do not have any obstructions such as clamping mechanisms or other holding elements within the channels to aid in holding the strip of line to the mechanism. It will be appreciated that the line channels and passageways of all of the embodiments of this invention are clear and completely free from elements that may obstruct or aid the mechanism for holding the line.

In this first embodiment, both line channels 56, 56a are transverse to the vertical axis (Z) of the mechanism 50 and are curved such that any portion of the strip of line capable of being received through the passageway 58, 58a of the respective line channel 56, 56a is bent at that portion of the strip of line away from the other line channel while passing through its line channel. Both line channels 56, 56a have an entrance 60, 60a and an exit 62, 62a. In this embodiment, the entrance 60 of one line channel 56 faces opposite the exit 62a of the other line channel 56a. The exit 62 of the one line channel 56 is adjacent to the entrance 60a of the other line channel 56a, while the exit 62 of the one line channel 56 is proximate to its entrance 60 and the entrance 60a of the other line channel 56a is proximate to its exit 62a.

To load the strip of line, it will be appreciated that the line 64 is first inserted into the first line channel 56 at entrance 60 and is pushed through the curved passageway 58 to the respective exit 62. The line is then "folded" and pushed into the second line channel 56a at its entrance 60a adjacent to the exit 62, whereupon it is disposed through the curved passageway 58a to the respective exit 62a. It will be appreciated that the resultant strip of line will be shaped with a kink or fold 66 near one end thereof, with the opposing ends 68, 69 of the strip of line pointing in opposite directions (see FIG. 6). Accordingly, it will be appreciated that, because the ends of the line are pointed in opposite directions, it is impossible to have equal length portions of line extending from the line-holding mechanism 50. Otherwise, the line would be hitting the central stem of the rotary trimmer device when pivoting about the axis Z. Consequently, it is required that one end of the line be shorter than the other. As such, one end of the line is of a length sufficient to extend beyond the periphery of the trimmer head to impact and cut vegetation, while the other end of the line is positioned close to the post portion and is of a length short enough to not extend beyond the periphery of the trimmer head and does not impact or cut vegetation. As noted above, anywhere from 2 to 6 mechanisms 50 can be spaced apart on the trimmer head 10, but only one line per mechanism extends to cut the vegetation, thereby providing less drag due to fewer ends of the strips of line being extended beyond the trimmer head to cut vegetation.

Figure 7:
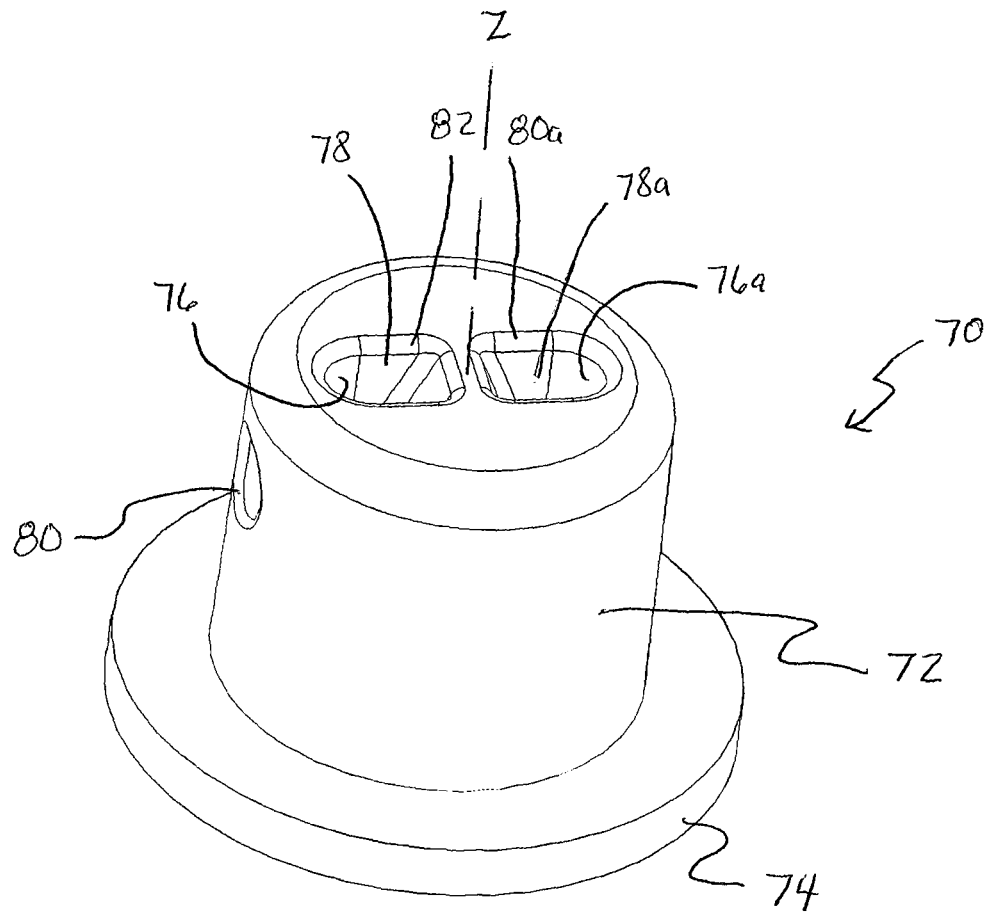
FIG. 7 is a perspective view of a second embodiment of a line-holding mechanism according to the concepts of the present invention.
Figure 8:
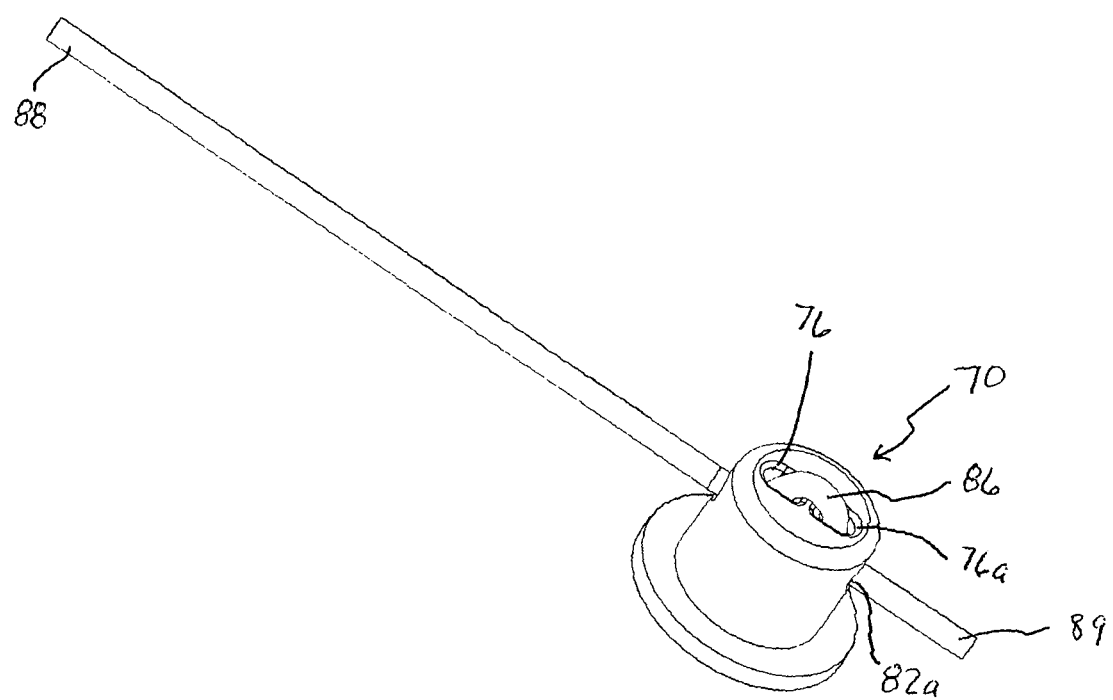
FIG. 8 is a perspective view of the line-holding mechanism of FIG. 7, having a strip of line loaded therein.

A second embodiment of a line-holding mechanism according to the concepts of the present invention is shown generally by the numeral 70 in FIGS. 7-8. This line-holding mechanism 70 includes a post portion 72 and a flange 74 which operate essentially as described above for the line-holding mechanisms 30 of the prior art. The flange 74 is disposed at one end of the post portion 72 and extends beyond the periphery of the post portion 72.

The post portion 72 includes two curved, unobstructed line channels 76, 76a, each of which defines a passageway 78, 78a adapted to receive a strip of line. In this second embodiment, both line channels 76, 76a are parallel to the vertical axis (Z) of the mechanism 70 and are curved such that any portion of the strip of line capable of being received through the passageway 78, 78a of the respective line channel 76, 76a is bent at that portion of the strip of line away from the other line channel while passing through its line channel. Both line channels 76, 76a have an entrance 80, 80a and an exit 82, 82a. In this embodiment, the entrance 80 of one line channel 76 faces opposite the exit 82a of the other line channel 76a. The exit 82 of the one line channel 76 is adjacent to the entrance 80a of the other line channel 76a, while the exit 82 of the one line channel 76 is proximate to its entrance 80 and the entrance 80a of the other line channel 76a is proximate to its exit 82a.

To load the strip of line, it will be appreciated that the line 84 is first inserted into the first line channel 76 at entrance 80 and is pushed through the curved passageway 78 to the respective exit 82 at the top of the post portion. The line is then "folded" and pushed down into the second line channel 76a at its entrance 80a adjacent to the exit 82, whereupon it is disposed through the curved passageway 78a to the respective exit 82a. It will be appreciated that the resultant strip of line will be shaped with a kink or fold 86 near one end thereof, with the opposing ends 88, 89 of the strip of line pointing in opposite directions (see FIG. 8). Accordingly, it will be appreciated that, because the ends of the line are pointed in opposite directions, it is impossible to have equal length portions of line extending from the line-holding mechanism 70. Otherwise, the line would be hitting the central stem of the rotary trimmer device when pivoting about the axis Z. Consequently, it is required that one end of the line be shorter than the other. As such, one end of the line is of a length sufficient to extend beyond the periphery of the trimmer head to impact and cut vegetation, while the other end of the line is positioned close to the post portion and is of a length short enough to not extend beyond the periphery of the trimmer head and does not impact or cut vegetation. As noted above, anywhere from 2 to 6 mechanisms 70 can be spaced apart on the trimmer head 10, but only one line per mechanism extends to cut the vegetation, thereby providing less drag due to fewer ends of the strips of line being extended beyond the trimmer head to cut vegetation.

Figure 9:
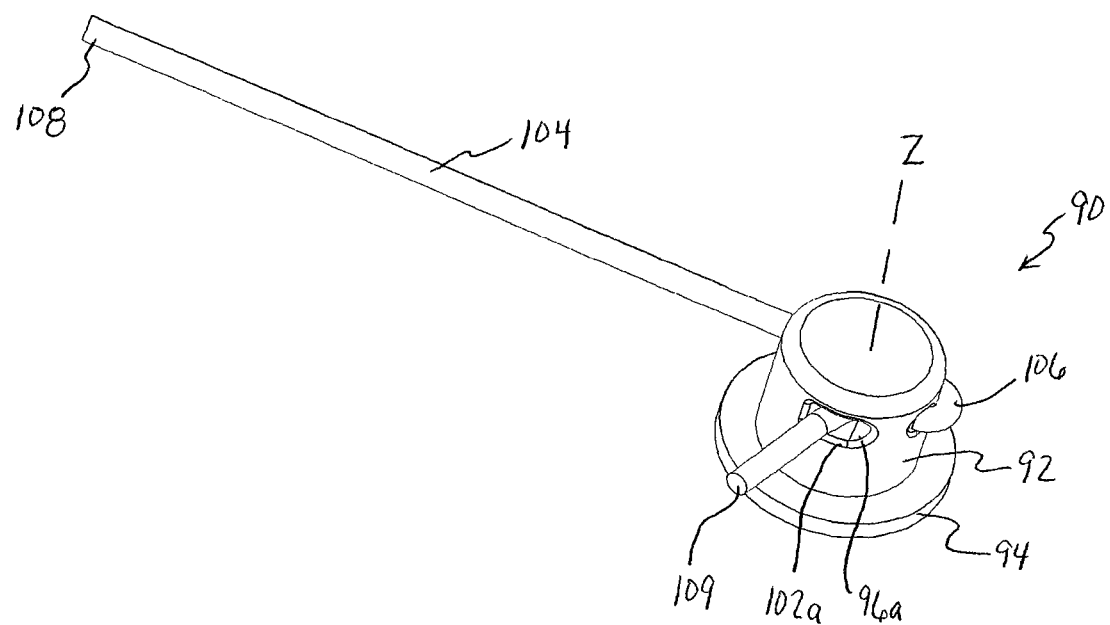
FIG. 9 is a perspective view of a third embodiment of a line-holding mechanism according to the concepts of the present invention, with strip of line loaded therein.
Figure 10:
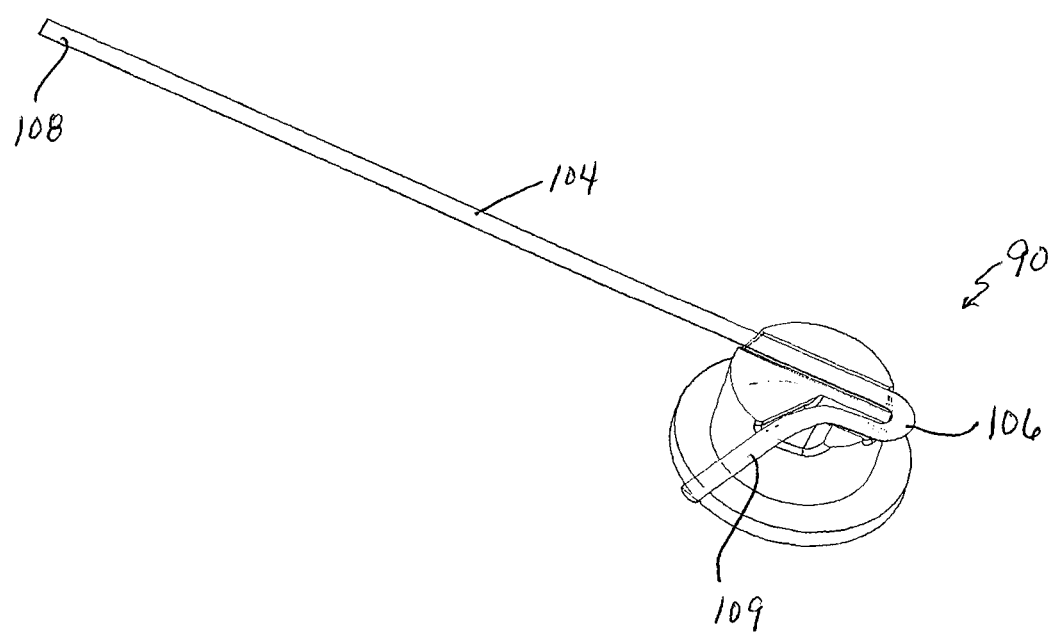
FIG. 10 is a perspective sectional view of the line-holding mechanism of FIG. 9, having a strip of line loaded therein.
Figure 11:
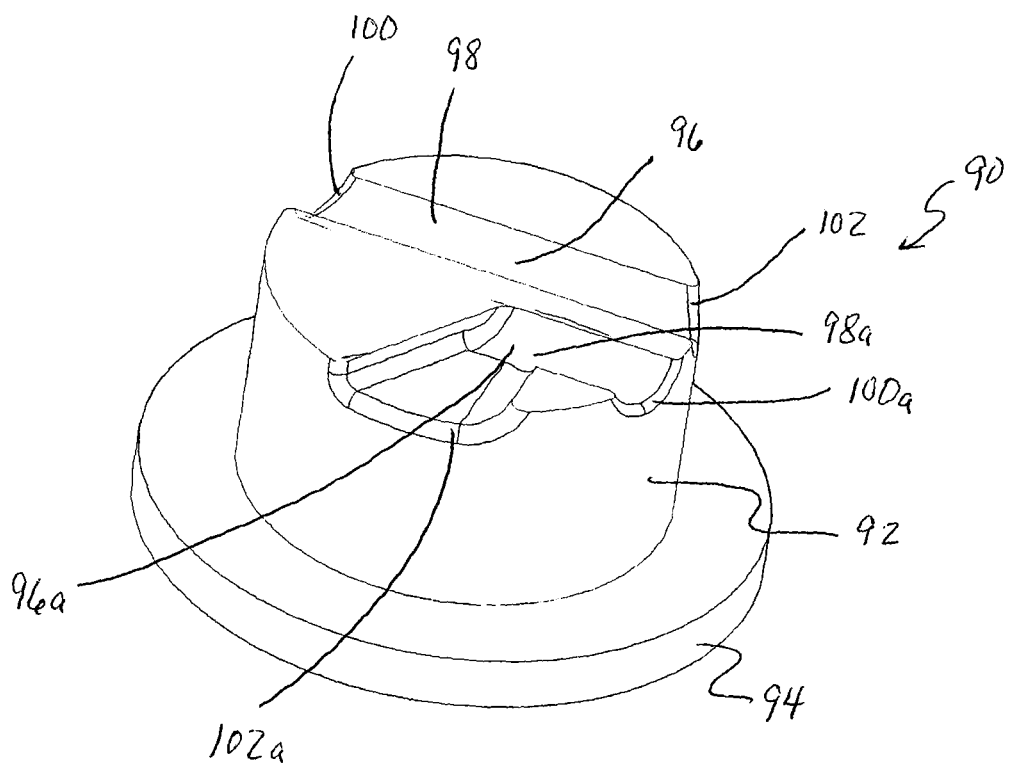
FIG. 11 is a perspective sectional view of the same line-holding mechanism of FIG. 10, without the strip of line present.

A third embodiment of a line-holding mechanism according to the concepts of the present invention is shown generally by the numeral 90 in FIGS. 9-11. This line-holding mechanism 90 again includes a post portion 92 and a flange 94 which operate essentially as described above for the line-holding mechanisms 30 of the prior art. The flange 94 is disposed at one end of the post portion 92 and extends beyond the periphery of the post portion 92.

In this embodiment, the post portion 92 includes one straight unobstructed line channel 96 and one curved, unobstructed line channel 96a. Each of line channels 96, 96a defines a passageway 98, 98a adapted to receive a strip of line. In this third embodiment, both line channels 96, 96a are transverse to the vertical axis (Z) of the mechanism 90. However, only line channel 96a is curved such that any portion of the strip of line capable of being received through the passageway 98a of the respective line channel 96a is bent at that portion of the strip of line away from the other line channel while passing through the line channel. Both line channels 96, 96a have an entrance 100, 100a and an exit 102, 102a. In this embodiment, the entrance 100 of the straight line channel 96 is substantially orthogonal, or at least not parallel to the exit 102a of the curved line channel 96a. The exit 102 of the straight line channel 96 is still adjacent to the entrance 100a of the curved line channel 96a, but the exit 102 of the straight line channel 96 is tangential to its entrance 100, while the entrance 100a of the curved line channel 96a is proximate to its exit 102a.

To load the strip of line, it will be appreciated that the line 104 is first inserted into the straight line channel 96 at entrance 100 and is pushed through the its straight passageway 98 to the respective exit 102. The line is then "folded" and pushed into the second line channel 96a, which is curved, at its entrance 100a adjacent to the exit 102, whereupon it is disposed through the curved passageway 98a to the respective exit 102a. It will be appreciated that the resultant strip of line will be shaped with a kink or fold 106 near one end thereof, with the opposing ends 108, 109 of the strip of line pointing in substantially orthogonal, or at least not parallel directions (see FIGS. 9 and 10). Accordingly, it will be appreciated that, because the ends of the line are pointed in non-parallel directions, it is extremely complicated, if not impossible, to have equal length portions of line extending from the line-holding mechanism 90. Otherwise, the line would be hitting the central stem of the rotary trimmer device when pivoting about the axis Z. Consequently, it is required that one end of the line be shorter than the other. As such, one end of the line is of a length sufficient to extend beyond the periphery of the trimmer head to impact and cut vegetation, while the other end of the line is positioned close to the post portion and is of a length short enough to not extend beyond the periphery of the trimmer head and does not impact or cut vegetation. As noted above, anywhere from 2 to 6 mechanisms 90 can be spaced apart on the trimmer head 10, but only one line per mechanism extends to cut the vegetation, thereby providing less drag due to fewer ends of the strips of line being extended beyond the trimmer head to cut vegetation.

Figure 12:
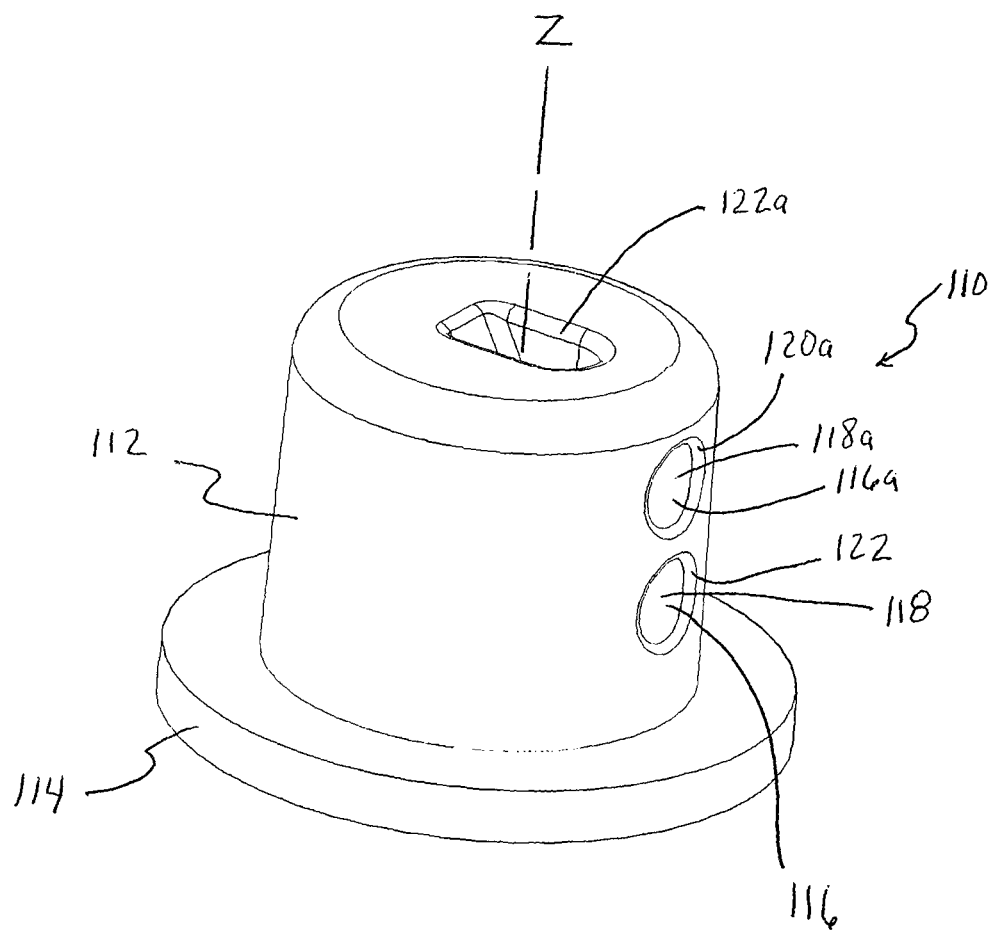
FIG. 12 is a perspective view of a fourth embodiment of a line-holding mechanism according to the concepts of the present invention.
Figure 13:
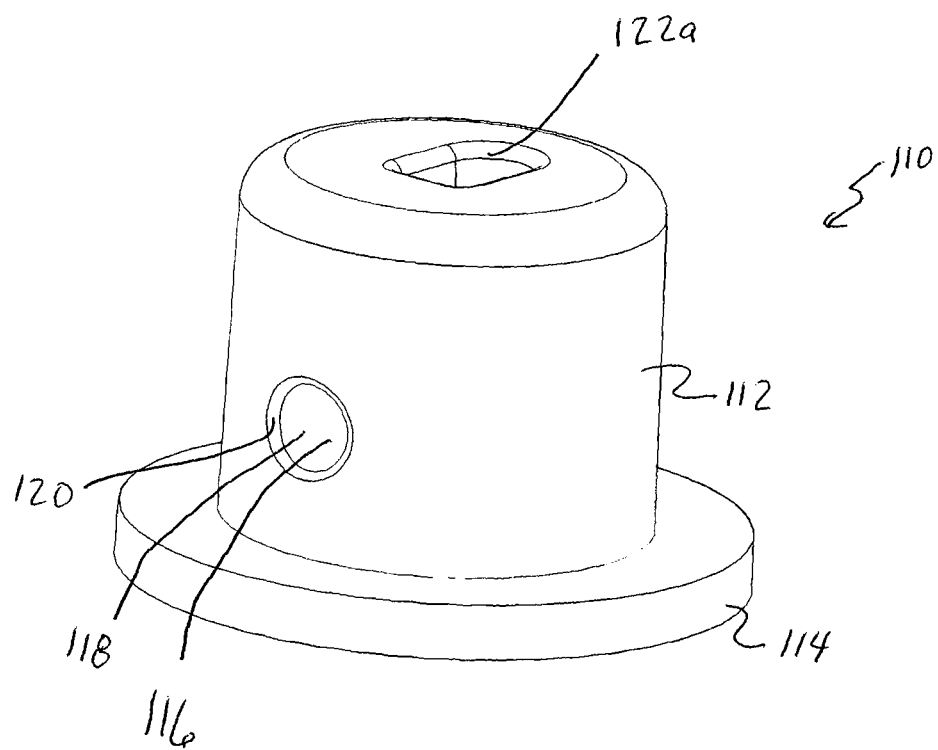
FIG. 13 is another perspective view of the line-holding mechanism of FIG. 12.
Figure 14:
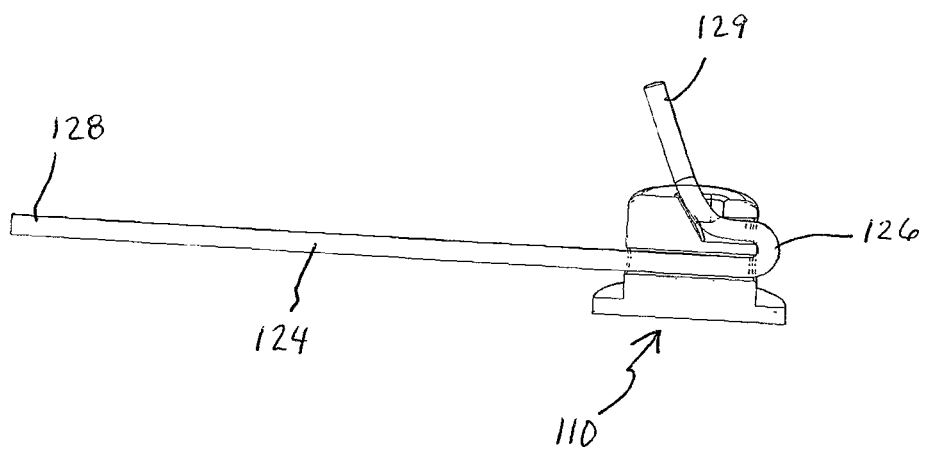
FIG. 14 is a side elevational, sectional view of the line-holding mechanism of FIG. 12, having a strip of line loaded therein.
Figure 15:
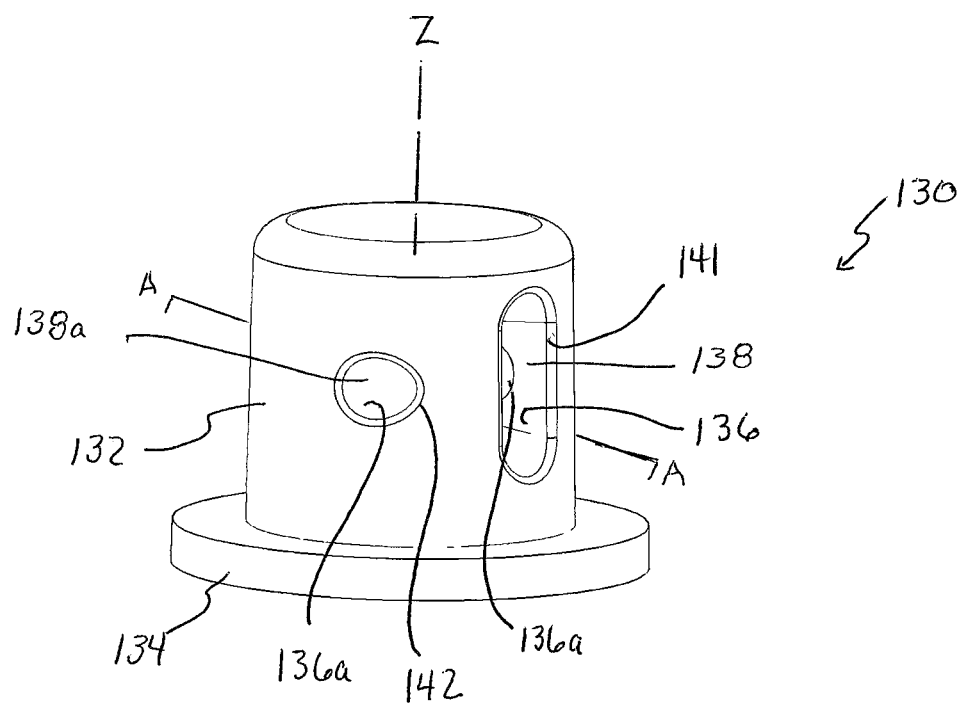
FIG. 15 is a perspective view of a fifth embodiment of a line-holding mechanism according to the concepts of the present invention.
Figure 16:
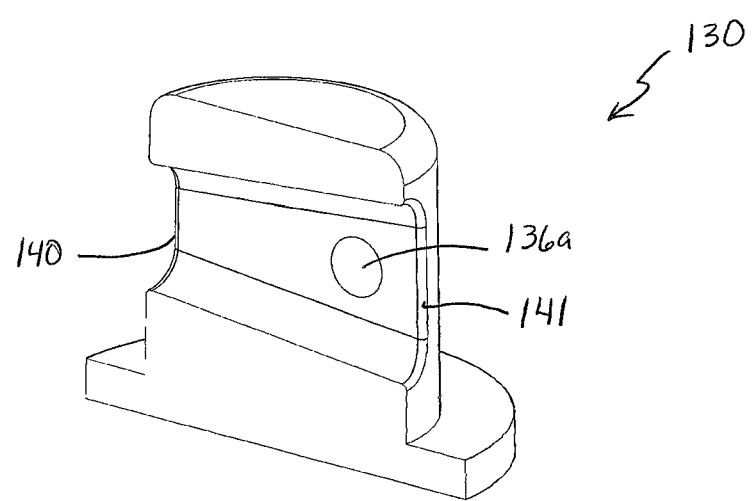
FIG. 16 is cross-sectional view of the line-holding mechanism of FIG. 15 taken along the line A-A in FIG. 15.
Figure 17:
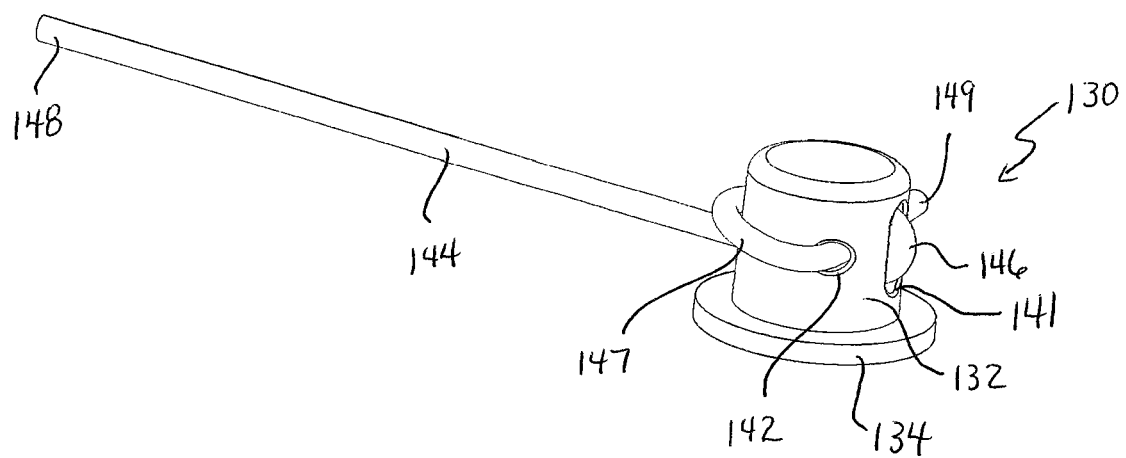
FIG. 17 is a perspective view of the line-holding mechanism of FIG. 15, having a strip of line loaded therein.
Figure 18:
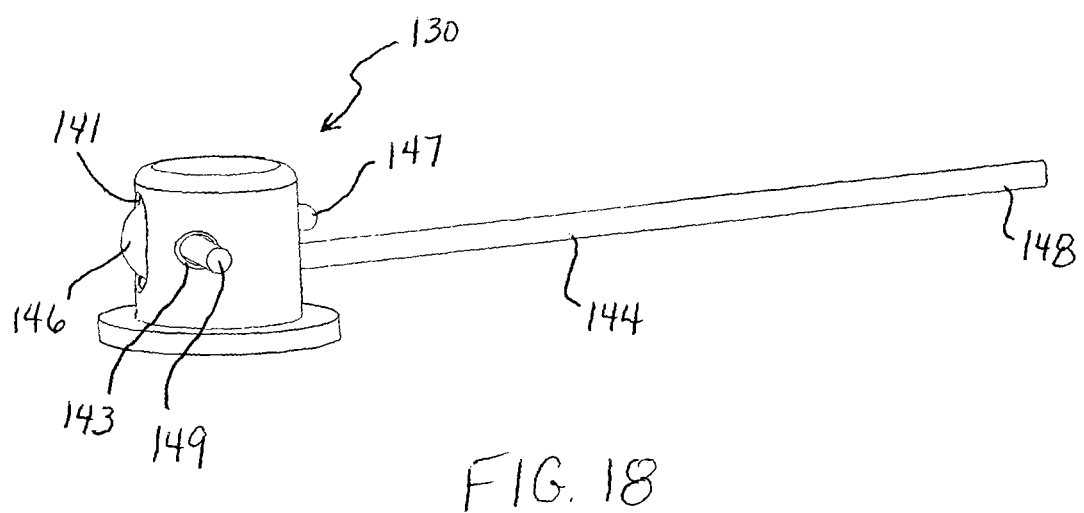
FIG. 18 is another perspective view of the line-holding mechanism of FIG. 15, having a strip of line loaded therein.

A fourth embodiment of a line-holding mechanism according to the concepts of the present invention is shown generally by the numeral 110 in FIGS. 12-14. This line-holding mechanism 110 again includes a post portion 112 and a flange 114 which operate essentially as described above for the line-holding mechanisms 30 of the prior art. The flange 114 is disposed at one end of the post portion 112 and extends beyond the periphery of the post portion 112.

In this embodiment, the post portion 112 also includes one straight unobstructed line channel 116 and one curved, unobstructed line channel 116a. Each of line channels 116, 116a defines a passageway 118, 118a adapted to receive a strip of line. In this fourth embodiment, both line channels 116, 116a are parallel to the vertical axis (Z) of the mechanism 110. However, only line channel 116a is curved such that any portion of the strip of line capable of being received through the passageway 118a of the respective line channel 116a is bent at that portion of the strip of line away from the other line channel while passing through the line channel. Both line channels 116, 116a have an entrance 120, 120a and an exit 122, 122a. In this embodiment, the entrance 120 of the straight line channel 116 is substantially orthogonal, or at least not parallel to the exit 122a of the curved line channel 116a. The exit 122 of the straight line channel 116 is still adjacent to the entrance 120a of the curved line channel 116a, but the exit 122 of the straight line channel 116 is tangential to its entrance 120, while the entrance 120a of the curved line channel 116a is proximate to its exit 122a.

To load the strip of line, it will be appreciated that the line 124 is first inserted into the straight line channel 116 at entrance 120 and is pushed through the its straight passageway 118 to the respective exit 122. The line is then "folded" upward and pushed into the second line channel 116a, which is curved, at its entrance 120a adjacent to the exit 122, whereupon it is disposed through the curved passageway 118a to the respective exit 122a. It will be appreciated that the resultant strip of line will be shaped with a kink or fold 126 near one end thereof, with the opposing ends 128, 129 of the strip of line pointing in substantially orthogonal, or at least not parallel directions (see FIG. 14). Accordingly, it will be appreciated that, in this case, the second end 129 of the strip of line 124 is pointed in an upwardly direction and as such, use of that end 129 of the line to cut vegetation is impossible. As such, one end of the line is of a length sufficient to extend beyond the periphery of the trimmer head to impact and cut vegetation, while the other end of the line is positioned close to the post portion and is of a length short enough to not extend beyond the periphery of the trimmer head and does not impact or cut vegetation. As noted above, anywhere from 2 to 6 mechanisms 110 can be spaced apart on the trimmer head 10, but only one line per mechanism extends to cut the vegetation, thereby providing less drag due to fewer ends of the strips of line being extended beyond the trimmer head to cut vegetation.

A fifth embodiment of a line-holding mechanism according to the concepts of the present invention is shown generally by the numeral 130 in FIGS. 15-18. This line-holding mechanism 130 again includes a post portion 132 and a flange 134 which operate essentially as described above for the line-holding mechanisms 30 of the prior art. The flange 134 is disposed at one end of the post portion 132 and extends beyond the periphery of the post portion 132.

However, this embodiment differs from the other embodiments in that the post portion 132 includes one straight unobstructed line channel 136a and one straight, pie-shaped, line channel 136 that is obstructed by the first straight line channel 136. Each of the line channels 136, 136a defines a passageway 138, 138a adapted to receive a strip of line. In this fifth embodiment, the first line channel 136 is pie-shaped and obstructed by the second line channel 136a. The pie shaped line channel 136 is essentially parallel to the vertical axis (Z) of the mechanism 130, while the straight line channel 136a is essentially orthogonal or transverse to the vertical axis (Z) of the mechanism 130.

Pie-shaped line channel 136 is unique in that it has an entrance 140 that is also its exit, but it also has an elongated opening 141 opposite its entrance 140 for folding the strip of line back into the same opening 141. Straight line channel 136 is tangentially disposed straight through the post portion 132.

To load the strip of line, it will be appreciated that the line 144 is first inserted into the straight, pie-shaped line channel 136 at its entrance 140 and is pushed through the its straight passageway 138 to the opening 141. The line 144 will necessarily be inserted below or above the obstructing straight line channel 136a within the passageway 138. Once through, the line may be folded or kinked upon its self and pushed back through opening 141, wherein the line 144 will be pushed over or under the obstructing line channel 136, whichever passageway is not already taken by the line 144 during its first pass through this passageway 138. Thus, the line forms a loop around the obstructing line channel 136. Upon exiting the entrance 140, the line is then wrapped around the post portion 132 to be inserted into the entrance 142 of line channel 136a, wherein it is then passed through the passageway 138a of that line channel 136a to an exit 143 on the other side of the post portion.

It will be appreciated that the resultant strip of line will be shaped with a kink or fold 146 near one end 149 thereof, within opening 141 around line channel 136a. There will also be a portion 147 of the line that is wrapped around the outside of the post portion 132 between the entrance 140 of the pie-shaped line channel 136 and the entrance 142 of the straight line channel 136a. In essence, it will be appreciated that the opposing ends 148, 149 of the strip of line 144 will be pointing in substantially orthogonal, or at least not parallel, directions (see FIGS. 17 and 18). Accordingly, it will be appreciated that, because the ends of the line are pointed in non-parallel directions, it is extremely complicated, if not impossible, to have equal length portions of line extending from the line-holding mechanism 130. Otherwise, the line would be hitting the central stem of the rotary trimmer device when pivoting about the axis Z. Consequently, it is required that one end of the line be shorter than the other. As such, one end of the line is of a length sufficient to extend beyond the periphery of the trimmer head to impact and cut vegetation, while the other end of the line is positioned close to the post portion and is of a length short enough to not extend beyond the periphery of the trimmer head and does not impact or cut vegetation. As noted above, anywhere from 2 to 6 mechanisms 130 can be spaced apart on the trimmer head 10, but only one line per mechanism extends to cut the vegetation, thereby providing less drag due to fewer ends of the strips of line being extended beyond the trimmer head to cut vegetation.

It will be appreciated that any of a number of variations of the design of the line channels can be provided. However, it will be appreciated that when at least one line channel is curved, the ends of the strip of line will most likely not be parallel to each other and as such, will need to have one end that is shorter than the other. Thus the invention advantageously provides for only one end of the strip of line being used to cut vegetation.

Other variations are within the spirit of the present invention. Thus, while the invention is susceptible to various modifications and alternative constructions, certain illustrated embodiments thereof are shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

It will be appreciated that more than one embodiments of the present invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A fixed-line trimmer head for a rotary trimmer device to be utilized with two or more strips of line, the trimmer head comprising:
   a housing operatively attachable to the rotary trimmer device, the housing being rotatable when in use around a central axis of rotation and having a upper portion and a lower portion extending radially from the central axis, the upper portion having a periphery, wherein the upper portion has a plurality of openings spaced from the periphery; and
   a plurality of mechanisms, each mechanism being pivotable around a vertical axis, adapted to hold a strip of line, and including a post portion disposed through one of the openings in the upper portion of the housing, and a flange disposed at one end of the post portion and sandwiched between the upper portion and lower portion to prevent vertical movement of the mechanism, wherein the post portion includes two unobstructed line channels disposed transversely to the vertical axis, each line channel defining a passageway adapted to receive the same strip of line, wherein each line channel comprises a non-cylindrical channel portion extending to a non-cylindrical opening and a cylindrical channel portion extending to a cylindrical opening, the non-cylindrical and cylindrical channel portions converging orthogonally within the post portion, wherein the non-cylindrical openings are proximate to one another, such that the strip of line exits from a first non-cylindrical opening and enters a second non-cylindircal opening.

2. The fixed-line trimmer head as claimed in claim 1, wherein both line channels of each post portion are curved such that any portions of the line capable of being received through the passageways of those line channels is bent at those portions of the strip of line while passing through the line channels.

3. The fixed-line trimmer head as claimed in claim 2, wherein the entrance of one line channel faces opposite the exit of the other line channel on the post portion of the mechanism.

4. The fixed-line trimmer head as claimed in claim 1, in combination with a plurality of strips of line adapted to cut vegetation, wherein each strip of line is held to the trimmer head by one of the plurality of mechanisms and is received through all of the passageways defined by the two line channels on the mechanism; wherein one end of the strip of line is distal from the mechanism and extends beyond the periphery of the upper portion of the housing of the trimmer head to cut vegetation, while the other end of the strip of line is proximate to the mechanism and does not extend beyond the periphery of the upper portion of the housing of the trimmer head.

5. A mechanism to be utilized for holding a strip of line, the mechanism comprising:
   a post portion; and
   a flange disposed at one end of the post portion and extending beyond the lateral periphery of the post portion configured to engage a housing to prevent vertical movement of the post portion,
   wherein the post portion extends vertically away from the flange and includes two unobstructed line channels disposed transversely to a vertical axis of the post portion, each having an entrance and an exit positioned on the post portion, each line channel defining a passageway adapted to receive the strip of line, wherein each line channel comprises a non-cylindrical channel portion extending to a non-cylindrical opening and a cylindrical channel portion extending to a cylindrical opening, the non-cylindrical and cylindrical channel portions converging orthogonally within the post portion, wherein the non-cylindrical openings are proximate to one another, such that the strip of line exits from a first non-cylindrical opening and enters a second non-cylindircal opening.

6. The mechanism as claimed in claim 5, wherein both line channels are curved such that any portion of the line capable of being received by the line channels must be bent at those portions while passing through the line channels.

7. The mechanism as claimed in claim 6, wherein the entrance of one line channel faces opposite the exit of the other line channel on the post portion of the mechanism.

* * * * *